(12) United States Patent
Haynes et al.

(10) Patent No.: US 8,971,245 B2
(45) Date of Patent: Mar. 3, 2015

(54) LATENCY-INSENSITIVE RAN—HIGH-CAPACITY/LATENCY-TOLERANT SESSION MANAGEMENT

(75) Inventors: Thomas W. Haynes, San Ramon, CA (US); Steven R. Rados, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 777 days.

(21) Appl. No.: 13/236,042

(22) Filed: Sep. 19, 2011

(65) Prior Publication Data

US 2013/0070669 A1  Mar. 21, 2013

(51) Int. Cl.
*H04W 4/00* (2009.01)
*H04W 8/24* (2009.01)
*H04W 76/02* (2009.01)

(52) U.S. Cl.
CPC ............... *H04W 8/24* (2013.01); *H04W 76/02* (2013.01)
USPC ........................................... 370/328; 370/338

(58) Field of Classification Search
None
See application file for complete search history.

(56) References Cited

U.S. PATENT DOCUMENTS

| 7,734,853 B2* | 6/2010 | Croxford ...................... 710/110 |
| 8,804,625 B2* | 8/2014 | Akhtar .......................... 370/329 |
| 2006/0217074 A1* | 9/2006 | Wakabayashi ................. 455/68 |
| 2007/0171861 A1* | 7/2007 | Akhtar .......................... 370/329 |
| 2008/0294820 A1* | 11/2008 | Croxford ...................... 710/105 |
| 2012/0155490 A1* | 6/2012 | Gibbs et al. ................... 370/467 |

* cited by examiner

*Primary Examiner* — Michael J Moore, Jr.

(57) ABSTRACT

A telecommunications network receives an indication that a user device, communicatively coupled to the telecommunications network, is a latency-insensitive device; receives connection information associated with a connection between the user device and the telecommunications network; stores, based on the indication that the user device is a latency-insensitive device, at least a portion of the connection information, associated with the connection between the user device and the telecommunications network, in a virtual memory of the server device; receives an indication that the connection is to become active; and places, based on receiving the indication that the connection is to become active, at least the portion of the connection information, associated with the connection between the user device and the telecommunications network, in a physical memory of the server device.

20 Claims, 8 Drawing Sheets

| UD ID 405 | BASE STATION ID 410 | CELL ID 415 | UD STATUS 420 | UD TYPE 425 |
|---|---|---|---|---|
| IMSI-1 | 120-1 | 1-C1 | ACTIVE | LI |
| MAC-2 | 120-1 | 1-C2 | INACTIVE | LS |
| IMSI-3 | 120-K | K-C1 | ACTIVE | LS |
| ⋮ | ⋮ | ⋮ | ⋮ | ⋮ |

LATENCY-INSENSITIVE RAN—HIGH-CAPACITY/LATENCY-TOLERANT SESSION MANAGEMENT

BACKGROUND

Cellular networks are commonly designed so that there is little or no network latency over a Radio Access Network ("RAN") or a core data network. In order to provide minimal latency to cellular connections over the cellular networks, network components store connection information in memory (e.g., volatile memory, such as random access memory, or "RAM"). However, cellular network capacity is limited by the RAM capacity of the components in the cellular network.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a cellular network to provide a class of service that provides higher latency than is traditionally provided by the cellular network. Network components within the cellular network (such as a base station controller ("BSC"), a mobility management entity device ("MME"), etc.) may store information, associated with connections between certain user devices (e.g., cellular telephones, personal digital assistants ("PDAs"), etc.), in a physical memory (e.g., in a volatile memory, such as a random access memory ("RAM")). Storing connection information for a user device may facilitate providing a low-latency connection between the user device and the cellular network.

The network components may also store information, associated with connections between other user devices (e.g., mobile code readers, parking meters, energy use monitors, vending machines, etc.) and the cellular network, in a virtual memory (e.g., in a non-volatile memory, such as a hard disk ("HDD") or a solid state drive ("SSD")). These other devices may include devices that are "non-mobile" (e.g., user devices with a fixed location, user devices that do not continuously report their location to the cellular network, and/or user devices that stay within the range of only one network element (e.g., one cell, one base station, etc.) of a Radio Access Network ("RAN")).

Additionally, or alternatively, network components may also store information, associated with connections between "mobile" user devices (e.g., cellular telephones, PDAs, etc.) and the cellular network, in a virtual memory. Such "mobile" user devices may include, for example, user devices that do not have a fixed location, user devices that continuously report their location to the cellular network, and/or user devices that do not stay within the range of only one network element (e.g., one cell, one base station, etc.) of a RAN, etc. These mobile user devices may include timers (e.g., a Tracking Area Update ("TAU") timer, an Idle Mode Signaling Reduction ("ISR") timer, etc.) that dictate how often the mobile user devices communicate with the network (e.g., to update their location with the network). These timers may be configurable, and may be configured based on whether the mobile user device is in a latency-sensitive mode or a latency-insensitive mode.

The information, associated with the connections between these other devices and the cellular network, may be stored in virtual memory when the connections are idle (or "parked"), and may be swapped into physical memory when the connections become active. While storing such connection information in virtual memory provides a higher latency than storing the connection in physical memory, the cellular network is able to accommodate more user devices than it would in an implementation that only relies on storing connection information in physical memory.

Since the cellular network of some embodiments is able to accommodate more user devices, network elements within the cellular network may be designed with parameters that specify the higher capacity. The higher parameters may aid network designers in designing the cellular network (e.g., when selecting new components, replacing/upgrading existing components, etc.).

Additionally, some user devices may include a switching capability that allows them to be switched from a low-latency mode (one for which connection information is stored only in network components' physical memory) to a high-latency mode (one for which connection information may be stored in network components' virtual memory). A user of such a user device may be able to switch the capability using a graphical user interface ("GUI") on the user device.

Figure 1:
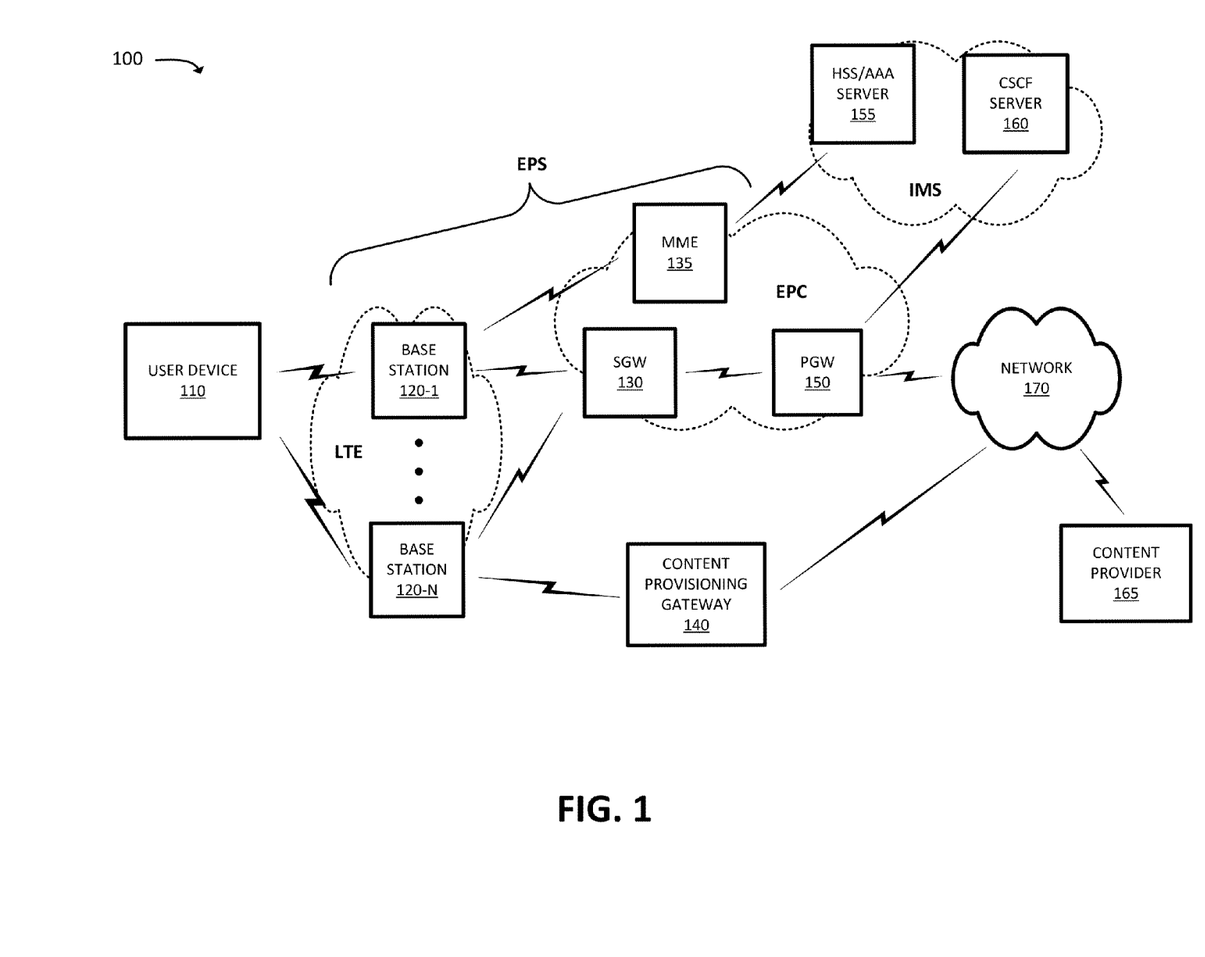
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include a user device 110, a group of base stations 120-1, . . . , 120-N (where N≥1) (hereinafter referred to collectively as "base stations 120" and individually as "base station 120"), a serving gateway 130 (hereinafter referred to as "SGW 130"), a mobility management entity device 135 (hereinafter referred to as "MME 135"), a content provisioning gateway 140 (hereinafter referred to as "content gateway 140"), a packet data network ("PDN") gateway ("PGW") 150, a home subscriber server (HSS)/authentication, authorization, accounting ("AAA") server 155 (hereinafter referred to as an "HSS/AAA server 155"), a call session control function ("CSCF") server 160 (hereinafter referred to as "CSCF server 160"), a content provider 165, and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

An implementation is described as being performed within a long term evolution ("LTE") network for explanatory purposes. In other implementations, the implementations may be performed within a network that is not an LTE network.

Environment 100 may include an evolved packet system ("EPS") that includes a LTE network and/or an evolved packet core ("EPC") that operate based on a third generation partnership project ("3GPP") wireless communication standard. The LTE network may be a RAN that includes one or more base stations 120 that take the form of evolved Node Bs ("eNBs") via which user device 110 communicates with the EPC. The EPC may include SGW 130, MME 135, and/or PGW 150 that enable user device 110 to communicate with network 170 and/or an Internet protocol ("IP") multimedia subsystem ("IMS") core. The IMS core may include HSS/AAA server 155 and/or CSCF server 160 and may manage authentication, session initiation, account information, profile information, etc. associated with user device 110.

User device 110 may include any computation or communication device, such as a wireless mobile communication device that is capable of communicating with base station 120 and/or a network (e.g., network 170). For example, user device 110 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, mobile code readers, parking meters, energy use monitors, vending machines, or another type of mobile computation or communication device. User device 110 may send traffic to and/or receive traffic from network 170.

Base station 120 may include one or more devices that receive, process, and/or transmit traffic, such as audio, video, text, and/or other data, destined for and/or received from user device 110. In an example implementation, base station 120 may be an eNB associated with the LTE network that receives traffic from and/or sends traffic to network 170 via SGW 130 and PGW 150. Base station 120 may send traffic to and/or receive traffic from user device 110 via an air interface. In another example, one or more other base stations 120 may be associated with a RAN that is not associated with the LTE network.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations 120 associated with the LTE network, and may send the aggregated traffic to network 170 (e.g., via PGW 150) and/or other network devices associated with the IMS core and/or the EPC. SGW 130 may also receive traffic from the other network devices and/or may send the received traffic to user device 110 via base station 120. SGW 130 may perform operations associated with handing off user device 110 from and/or to the LTE network.

MME 135 may include one or more computation or communication devices that gather, process, search, store, and/or provide information in a manner described herein. For example, MME 135 may perform operations relating to authentication of user device 110. In some implementations, MME 135 may facilitate the selection of a SGW 130 and/or PGW 150 to serve traffic to/from user device 110. MME 135 may perform operations associated with handing off user device 110, from a first base station 120 to a second base station 120, when user device 110 is exiting a cell associated with the first base station 120.

MME 135 may also perform an operation to handoff user device 110 from the second base station 120 to the first base station 120 when user device 110 is entering the cell associated with first base station 120. Additionally, or alternatively, MME 135 may select another MME (not pictured), to which user device 110 should be handed off (e.g., when user device 110 moves out of range of MME 135). For example, in some implementations, MME 135 may not be designated as a latency-insensitive MME, while another MME that serves the same area as MME 135 may be designated as a latency-insensitive MME. Upon receiving a latency-insensitive connection, MME 135 may hand off the connection to the other MME, that is designated as a latency-insensitive MME.

MME 135 may also perform other functions, such as Non Access Stratum ("NAS") signaling and Access Stratum ("AS") security control. In order to provide these functions, MME 135 may store information relating to one or more user devices 110, and the connections associated with the one or more user devices 110 (as discussed further below with respect to FIG. 4).

Content gateway 140 may include one or more gateway devices, or other types of computation or communication devices, that gather, process, search, store, and/or provide information in a manner described herein. In an example implementation, content gateway 140 may process unicast and/or multicast traffic to be distributed to one or more user devices 110. For example, content gateway 140 may receive traffic (e.g., streaming video and/or audio, progressive video and/or audio, etc.) from content provider 165. Content gateway 140 may transmit the traffic to user device 110 via network 170, the EPC and/or the LTE. Content gateway 140 may buffer the traffic to ensure that the traffic is transmitted at a bandwidth and/or data rate that conforms to a policy associated with network 170, that abides by a service level agreement (SLA) with user device 110, and/or that can be processed by user device 110.

Content gateway 140 may transmit the traffic as unicast traffic or multicast traffic. For example, content gateway 140 may transmit unicast traffic that is destined for user device 110. In another example, content gateway 140 may transmit the traffic as multicast traffic that is destined for a group of user devices 110 (e.g., associated with a multicast group membership). When transmitting the multicast traffic, content gateway 140 may transmit a multicast stream to base station 120 for distribution to one or more user devices 110 identified by the multicast stream. In another example, content gateway 140 may transmit a copy of the multicast stream to another base station 120 for distribution to another one or more user devices 110 identified by the copy of the multicast stream.

Content gateway 140 may communicate with base stations 120 to obtain traffic load information associated with each base station 120. Content gateway 140 may use the traffic load information to allocate RAN resources among each of base stations 120 and/or among frequency bands that are supported by third generation (3G) and/or fourth generation (4G) technologies that are based on the 3GPP standard. The frequency bands may include, for example, a PCS band, an advanced wireless services ("AWS") band, a lower 700 megahertz ("MHz") band, an upper 700 MHz band, a cellular band, and/or some other band (e.g., as specified by a 3GPP standard, etc.). For example, content gateway 140 may allocate a first frequency band and/or channel to an application and/or service (e.g., voice-over-IP ("VoIP") traffic, voice traffic, etc.). In another example, content gateway 140 may allocate a second frequency band and/or channel to another application and/or service (e.g., Internet traffic, email traffic, etc.). In yet another example, content gateway 140 may allocate a third frequency band and/or channel to a further application and/or service to be transmitted as multicast traffic (e.g., using an evolved multimedia broadcast multicast service ("eMBMS") protocol that can be implemented by the LTE network based on 4G technologies).

PGW 150 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 150 may include a device that aggregates traffic received from one or more SGWs 130, etc. and may send the aggregated traffic to network 170. In another example implementation, PGW 150 may receive traffic from network 170 and may send the traffic toward user device 110 via SGW 130.

HSS/AAA server 155 may include one or more server devices, or other types of computation or communication devices, that gather, process, search, store, and/or provide information in a manner described herein. For example, HSS/AAA server 155 may manage, update, and/or store, in a memory associated with HSS/AAA server 155, profile information associated with user device 110 that identifies applications and/or services that are permitted for and/or accessible by user device 110, information associated with a user of user device 110 (e.g., a username, a password, a personal identification number ("PIN"), etc.), rate information, minutes allowed, and/or other information. The profile information, associated with user device 110 and stored by HSS/AAA server 155, may also identify whether user device 110 is a latency-insensitive device (or has a latency-insensitive mode). Additionally, or alternatively, HSS/AAA server 155 may include a device that performs authentication, authorization, and/or accounting operations associated with a communication session with user device 110.

CSCF server 160 may include one or more server devices, or other types of computation or communication devices, that gather, process, search, store, and/or provide information in a manner described herein. CSCF server 160 may process and/or route calls to and from user device 110 via the EPC. For example, CSCF server 160 may process calls, received from network 170, that are destined for user device 110. In another example, CSCF server 160 may process calls, received from user device 110, that are destined for network 170.

Content provider 165 may include any type or form of content provider. For example, content provider 165 may include a website host (e.g., a provider of one or more websites, such as websites located at www.verizon.com, www.yahoo.com, www.nbc.com, etc.). Additionally, or alternatively, content provider 165 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded (e.g., via progressive download, etc.). Content provider 165 may include on-demand content providers (e.g., video on demand providers, pay per view providers, etc.).

Network 170 may include one or more wired and/or wireless networks. For example, network 170 may include a cellular network, a public land mobile network ("PLMN"), a second generation (2G) network, a 3G network, a 4G network, a fifth generation ("5G") network, and/or another network. Additionally, or alternatively, network 170 may include a wide area network ("WAN"), a metropolitan area network ("MAN"), a telephone network (e.g., the Public Switched Telephone Network ("PSTN")), an ad hoc network, an intranet, the Internet, a fiber optic-based network (e.g., "FiOS"), and/or a combination of these or other types of networks.

Figure 2:
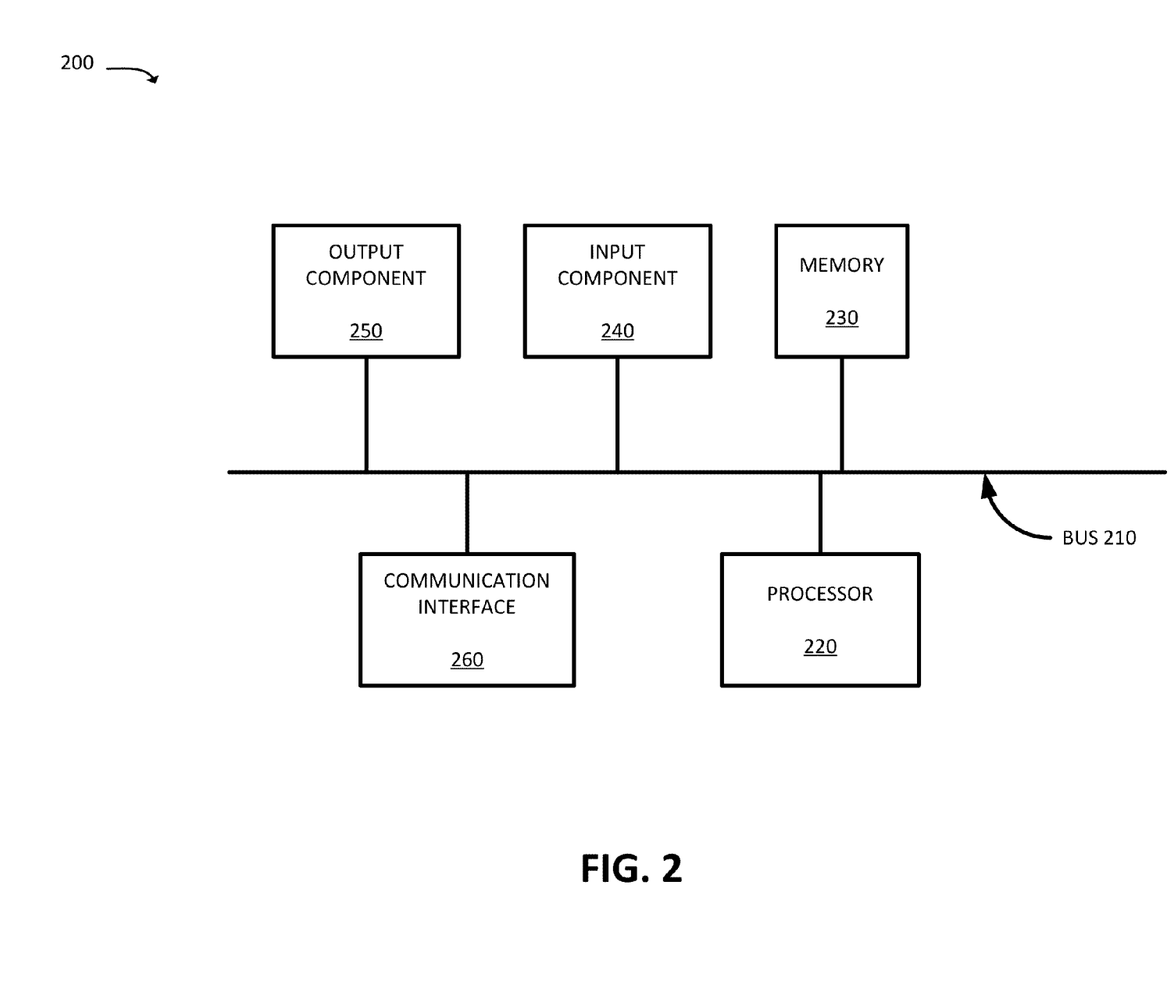
FIG. 2 is a diagram of example components of one or more devices of FIG. 1.

FIG. 2 is a diagram of example components of a device 200. Device 200 may correspond to user device 110, SGW 130, MME 135, content gateway 140, PGW 150, HSS/AAA server 155, CSCF server 160, and/or content provider 165. Alternatively, or additionally, each of user device 110, SGW 130, MME 135, content gateway 140, PGW 150, HSS/AAA server 155, CSCF server 160, and/or content provider 165 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes ("LEDs"), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 170. In one alternative implementation, communication interface 260 may be a logical component that includes input and output ports, input and output systems, and/or other input and output components that facilitate the transmission of data to other devices.

As described herein, device 200 may perform certain operations relating to latency-insensitive telecommunications. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
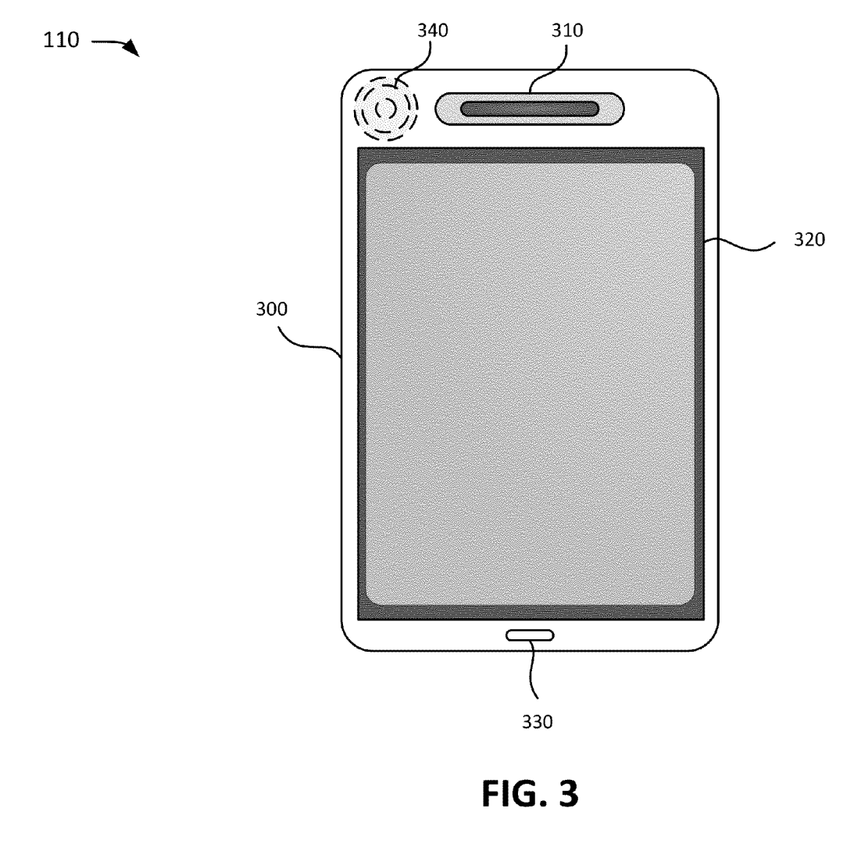
FIG. 3 is a diagram of example components of one or more devices of FIG. 1.

FIG. 3 is a diagram of an example user device 110. As shown in FIG. 3, user device 110 may include housing 300, speaker 310, display 320, microphone 330, and/or camera 340. Housing 300 may include a chassis via which some or all of the components of user device 110 are mechanically secured and/or covered. Speaker 310 may include a component to receive input electrical signals from user device 110 and transmit audio output signals, which communicate audible information to a user of user device 110.

Display 320 may include a component to receive input electrical signals and present a visual output in the form of text, images, videos and/or combinations of text, images, and/or videos which communicate visual information to the user of user device 110. In one implementation, display 320 may display text input into user device 110, text, images, and/or video received from another device, and/or information regarding incoming or outgoing calls or text messages, emails, media, games, phone books, address books, the current time, etc.

Display 320 may be a touch screen that presents one or more images that correspond to control buttons. The one or more images may accept, as input, mechanical pressure from the user (e.g., when the user presses or touches an image corresponding to a control button or combinations of control buttons) and display 320 may send electrical signals to processor 220 that may cause user device 110 to perform one or more operations. For example, the control buttons may be used to cause user device 110 to transmit information. Display 320 may present one or more other images associated with a keypad that, in one example, corresponds to a standard telephone keypad or another arrangement of keys.

Microphone 330 may include a component to receive audible information from the user and send, as output, an electrical signal that may be stored by user device 110, transmitted to another user device, or cause user device 110 to perform one or more operations. Camera 340 may be provided on a front or back side of user device 110, and may include a component to receive, as input, analog optical signals and send, as output, a digital image or video that can be, for example, viewed on display 320, stored in the memory of user device 110, discarded and/or transmitted to another user device 110.

Although FIG. 3 depicts example components of user device 110, in other implementations, user device 110 may include fewer components, additional components, different components, or differently arranged components than illustrated in FIG. 3. For example, user device 110 may include a keyboard, a keypad, and/or other input components. In still other implementations, one or more components of user device 110 may perform one or more tasks described as being performed by one or more other components of user device 110.

Figure 4:
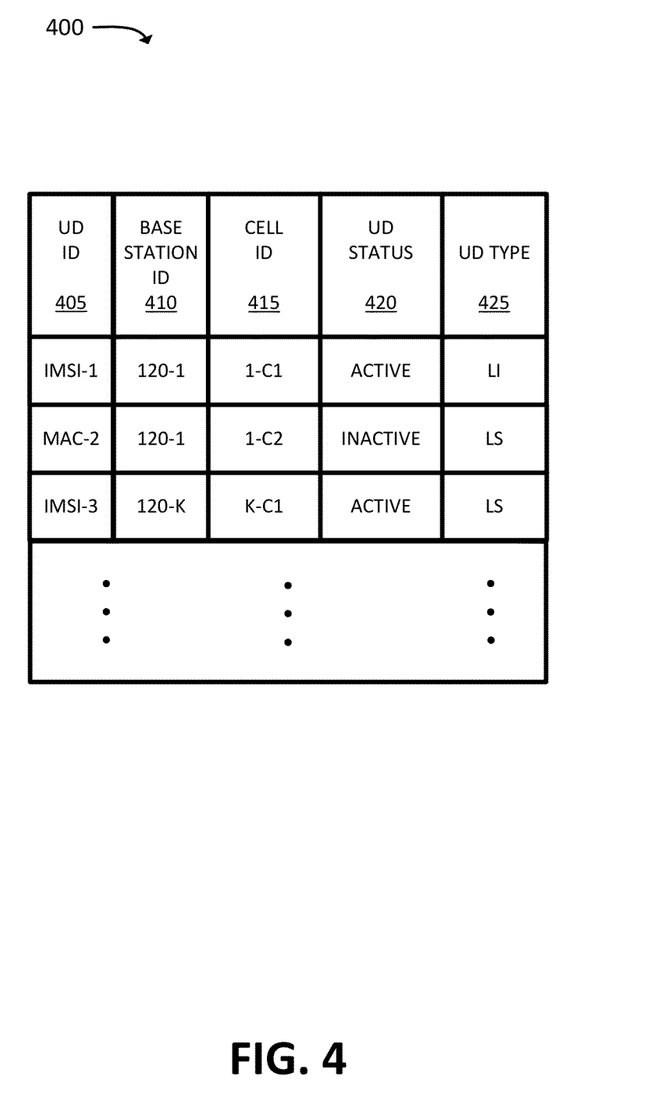
FIG. 4 is a diagram of an example data structure that stores information associated with a connection.

FIG. 4 is a diagram of an example data structure 400 that stores information associated with a connection, associated with one or more user devices 110. Data structure 400 may be stored in a memory device (e.g., RAM, hard disk, etc.) associated with one or more network components shown in FIG. 1. For example, data structure 400 may be stored by BS 120, MME 135, etc.

Data structure 400 may include a collection of fields, such as a user device identifier ("UD ID") field 405, a base station identifier ("base station ID") field 410, a cell identifier ("cell ID") field 415, a user device status ("UD status") field 420, and a user device type ("UD type") field. Data structure 400 includes fields 405-425 for explanatory purposes. In practice, data structure 400 may include additional fields, fewer fields, different fields, or differently arranged fields than are described with respect to data structure 400.

UD ID field 405 may store information associated with user device 110. For example, the information, associated with user device 110, may include a device identifier (e.g., a mobile directory number ("MDN"), an electronic serial number ("ESN"), a subscriber identity module ("SIM") universal resource identifier ("URI"), an international mobile subscriber identifier ("IMSI"), and/or another unique identifier associated with user device 110).

Base station ID field 410 may store information associated with base station 120 (e.g., a base station ID), via which user device 110 communicates with network 170. Cell ID field 415 may store information associated with a particular cell (e.g., a cell ID), associated with base station 120, that serves user device 110 when communicating with network 170. UD status field 420 may store an indication regarding whether user device 110 is actively communicating with network 170. For example, UD status field 420 may store an indication that user device 110 is present (e.g., powered up) and is actively communicating (e.g., is sending and/or receiving messages via base station 120). Also, or alternatively, UD status field 420 may store an indication that user device 110 is present, but is not actively communicating (e.g., has not sent/or received messages for at least a threshold duration of time). In yet another example, UD status field 420 may store an indication that user device 110 is not present on the RAN (e.g., when user device 110 is not powered up and/or is not located within a cell associated with the RAN).

UD type field 425 may store information indicating whether user device 110 is a latency-sensitive device (or is in latency-sensitive mode), or a latency-insensitive device (or is in latency-insensitive mode). A value of "LI" may indicate that user device 110 is latency-insensitive, while a value of "LS" may indicate that user device 110 is latency-sensitive. While "LI" and "LS" are presented as examples, other example implementations may use different indicators (e.g., "I" and "S," "1" and "0," etc.). As will be further described below, MME 135 may utilize UD type field 425 when determining whether to store connection information for a particular user device 110 in virtual memory or in physical memory.

Information for a single user device 110 is conceptually represented as a row in data structure 400. For example, the first row in data structure 400 corresponds to a user device 110 that has a UD ID of "IMSI-1," a base station ID of "120-1," a cell ID of "1-C1," a UD status of "active," and a UD type of "LI." When storing information for a particular user device 110 in virtual memory, MME 135 may store some or all of the fields for the particular user device 110 in virtual memory. Likewise, when storing information for a particular user device 110 in physical memory, MME 135 may store some or all of the fields for the particular user device 110 in physical memory.

Figure 5:
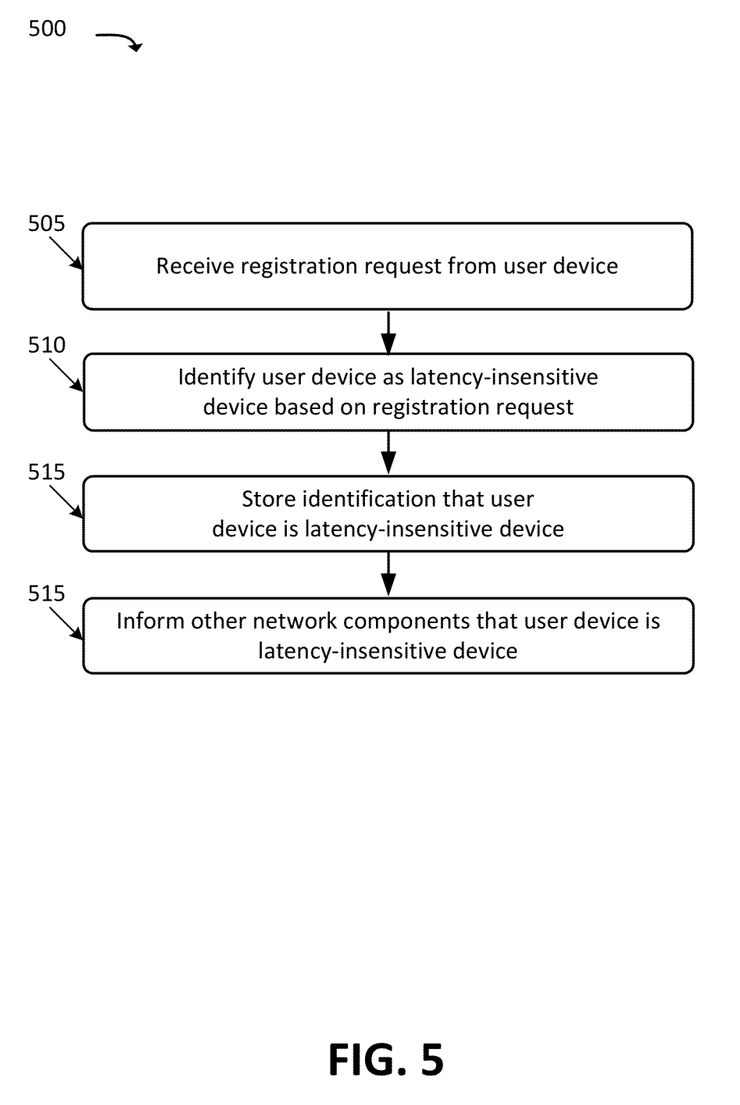
FIG. 5 is a diagram of an example process for a user device registering as a latency-insensitive user device.

FIG. 5 is a diagram of an example process 500 for a user device 110 registering as a latency-insensitive device. In one example implementation, process 500 may be performed by MME 135. In another example implementation, some or all of process 500 may be performed by a device or collection of devices separate from, or in combination with, MME 135. For example, process 500 may be performed by HSS/AAA server 155, or another device shown in FIG. 1.

As shown in FIG. 5, process 500 may include receiving a registration request from a user device (e.g., user device 110) (block 505). The registration request may be received via one or more intermediate network components that communicate messages on behalf of user device 110. For example, MME 135 may receive the registration request from base station 120, which may receive the registration request from user device 110. Additionally, or alternatively, HSS/AAA server 155 may receive the registration request from MME 135.

The registration request may include an identification that user device 110 is a latency-insensitive device. User device 110 may include this indication itself when sending the registration request. Alternatively, or additionally, an intermediate network component may identify that user device 110 is a latency-insensitive device. For example, MME 135 may identify, based on information in the registration request (e.g., a device identifier), that user device 110 is a latency-insensitive device. In such an implementation, MME 135 may insert the indication into the registration request before forwarding the registration request to HSS/AAA server 155. Alternatively, or additionally, HSS/AAA server 155 itself may identify that user device 110 is a latency-insensitive device. For example, HSS/AAA server 155 may identify, based on information in the registration request (e.g., a device identifier), that user device 110 is a latency-insensitive device.

The registration request may be sent by user device 110 when user device 110 first requests registration (e.g., upon first powering up user device 110, upon first entering a range of a base station 120 associated with MME 135, etc.). Alternatively, or additionally, the registration request may be sent by user device 110 after user device 110 has already registered (e.g., MME 135 and/or HSS/AAA server 155 have already registered user device 110). For example, as will be further described below, a mode of user device 110 may be switched from latency-sensitive to latency-insensitive, or vice versa, during operation of user device 110.

As further shown in FIG. 5, process 500 may include identifying user device 110 is a latency-insensitive device based on the registration request (block 510), and storing the identification that user device 110 is a latency-insensitive device (block 515). For example, MME 135 or HSS/AAA server 155 may identify that the registration request includes an indication that user device 110 is a latency-insensitive device. Upon making such an identification, MME 135 or HSS/AAA server 155 may store, in a memory device, the identification of user device 110 as a latency-insensitive device.

MME 135 or HSS/AAA server 155 may also store identifications of user devices 110 that are latency-sensitive devices. If user device 110 is a latency-sensitive device, the registration request may identify user device 110 as a latency-sensitive device. Alternatively, the registration request may not include any indication as to whether user device 110 is a latency-sensitive or latency-insensitive device. If no such indication is included in the registration request, MME 135 or HSS/AAA server 155 may assume, by default, that user device 110 is a latency-sensitive device.

As also shown in FIG. 5, process 500 may include informing other network components that user device 110 is a latency-insensitive device (block 520). For example, MME 135 may send a message to other network components (e.g., to base station 120, another MME, etc.), informing the other network components that user device 110 is a latency-insensitive device. Additionally, or alternatively, HSS/AAA server 155 may send a message to other network components (e.g., to MME 135, base station 120, etc.), informing the other network components that user device 110 is a latency-insensitive device.

Additionally, or alternatively, MME 135 may hand off the connection to another MME, based on determining that user device 110 is a latency-insensitive device. For example, MME 135 may determine that MME 135 is not designated as an MME that handles latency-insensitive connections. MME 135 may store an identification of the other MME, which may be designated as an MME that handles latency-insensitive connections. In such an implementation, MME 135 may provide connection information to the other MME, and may also inform other network components (e.g., base station 120 or HSS/AAA server 155) that the other MME is serving the connection associated with user device 110.

Figure 6:
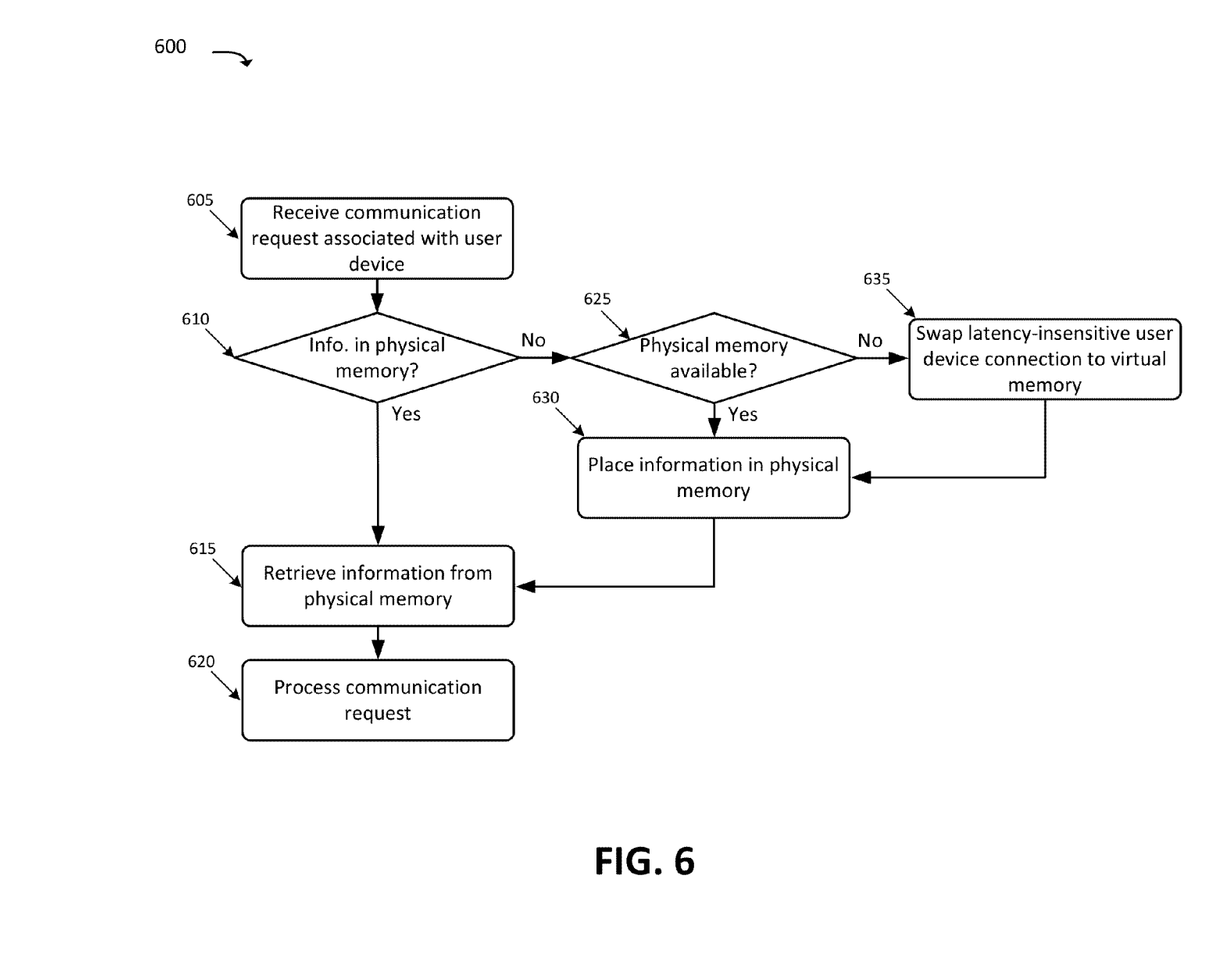
FIG. 6 is a diagram of an example process for operation of one or more components of a network in communication with a latency-insensitive user device.

FIG. 6 is a diagram of an example process 600 for operation of one or more components of a network in communication with a latency-insensitive user device. In one example implementation, process 600 may be performed by MME 135. In another example implementation, some or all of process 600 may be performed by a device or collection of devices separate from, or in combination with, MME 135. For example, base station 120 or HSS server 155 may perform process 600 in addition to, or in lieu of, MME 135. However, for the sake of simplicity, process 600 is described below in the context of being performed by MME 135.

FIG. 6 may include receiving information associated with latency-insensitive user device 110 (block 605). For example, MME 135 may receive an indication from HSS/AAA server 155 that user device 110 has registered with HSS/AAA server 155, and that user device 110 is a latency-insensitive user device. Additionally, or alternatively, MME 135 may determine, based on a registration request from user device 110, that user device 110 is a latency-insensitive user device (as described above). Additionally, or alternatively, MME 135 may be an MME that is dedicated to serving latency-insensitive devices. In such an implementation, MME 135 may receive the information, associated with user device 110, as handoff information from another MME (e.g., another MME that serves a same geographic region as MME 135). The received information may also include connection information, associated with user device 110. For example, the received information may include some or all of the data shown in data structure 400, of FIG. 4.

As also shown in FIG. 6, process 600 may include receiving a communication request associated with latency-insensitive user device 110 (block 605). For example, user device 110 may attempt to initiate a telephone call, send data, request data, access network 170, etc. Additionally, or alternatively, a communication (e.g., a telephone call, data, etc.), intended for user device 110, may be sent from network 170, or another network.

Upon receiving the communication request at block 605, process 600 may include determining whether connection information (e.g., some or all of information shown in FIG. 4, with respect to data structure 400), associated with user device 110, is present in physical memory (block 610). For example, MME 135 may determine whether the connection information is in a physical memory of MME 135. When making this determination, a software application, being executed by one or more processors of MME 135, may make a call to an operating system of MME 135 in order to determine whether the connection information is in physical memory. The operating system may reply with a "hit" (an indication that the requested information is in physical memory) or a "miss" (an indication that the requested information is not in physical memory).

If the connection information is in physical memory (block 610—YES), process 600 may include retrieving the connection information from physical memory (block 615). Once the connection information is retrieved, MME 135 may serve the connection, associated with user device 110 (block 620). For instance, MME 135 may perform one or more functions described above with respect to the discussion of FIG. 1.

If the connection information is not in physical memory (block 610—NO), process 600 may include determining whether physical memory is available (block 625). For example, MME 135 may determine whether MME 135 has enough physical memory (e.g., RAM or another type of volatile memory) available to store the connection information. Making such a determination may include requesting information about the available physical memory from an operating system of MME 135. When determining whether MME 135 has enough physical memory available, MME 135 may also determine how much memory is needed to store the connection information associated with user device 110. In order to make such a determination, MME 135 may analyze the connection information, in order to determine a size (e.g., a number of bytes) of the information, and compare the determined size to the determined amount of available physical memory. Also, MME 135 may analyze an amount of available physical memory, and compare the amount of available physical memory to a threshold.

If enough physical memory is available (block 625—YES), process 600 may include placing the connection information into physical memory (block 630). After placing the connection information into the physical memory (block 630), process 600 may include retrieving the connection information from physical memory (block 615). Once the connection information is retrieved, MME 135 may serve the connection, associated with user device 110 (block 620). For instance, MME 135 may perform one or more functions described above with respect to the discussion of FIG. 1.

If, on the other hand, enough physical memory is not available (block 625—NO), process 600 may include swapping connection information, associated with one or more other latency-insensitive user devices, into virtual memory (block 635). By swapping connection information, associated with one or more other latency-insensitive user devices, into virtual memory, MME 135 may free the physical memory needed for the connection information for user device 110.

MME 135 may select the one or more other user devices 110 based on whether the one or more other user devices 110 are latency-sensitive or latency-insensitive devices. In some implementations, MME 135 may only choose to swap connection information (e.g., free the physical memory occupied by the connection information) for latency-insensitive user devices into virtual memory. In other implementations, MME 135 may prefer to swap connection information (e.g., free the physical memory occupied by the connection information) for latency-insensitive user devices into virtual memory before swapping connection information for latency-sensitive user devices.

Additionally, or alternatively, MME 135 may prefer to swap connection information for user devices 110, that are associated with the most idle connections, into virtual memory. In order to determine the most idle connections, MME 135 may identify connections for which communications have not been received for a longest period of time. For example, if a first user device 110 has placed a phone call two hours ago, and a second user device 110 has placed a phone call four hours ago, MME 135 may identify that the second user device 110 has a "more idle" connection. MME 135 may store information identifying a timestamp of a last communication, which allows MME 135 to determine which connections may be considered as "idle."

As a further example, MME 135 may identify a first latency-sensitive user device 110 that has placed a call four hours ago, a second latency-insensitive user device 110 that has placed a call two hours ago, and a third latency-insensitive device 110 that has placed a call one hour ago. MME 135 may select the connection information associated with the second user device 110, since the second user device 110 has the most idle connection out of the latency-insensitive user devices. In this example, even though the first user device 110 has a more idle connection than the second user device 110, MME 135 may determine that the first user device 110 is not to be selected (to have its connection information swapped into virtual memory), since it is a latency-sensitive user device.

Once the connection information for the one or more other user devices is swapped into virtual memory (block 635), process 600 may include placing the connection information for user device 110 into physical memory (block 630). After placing the connection information into the physical memory (block 639), process 600 may include retrieving the connection information from physical memory (block 615). Once the connection information is retrieved, MME 135 may serve the connection, associated with user device 110 (block 620). For instance, MME 135 may perform one or more functions described above with respect to the discussion of FIG. 1.

Figure 7:
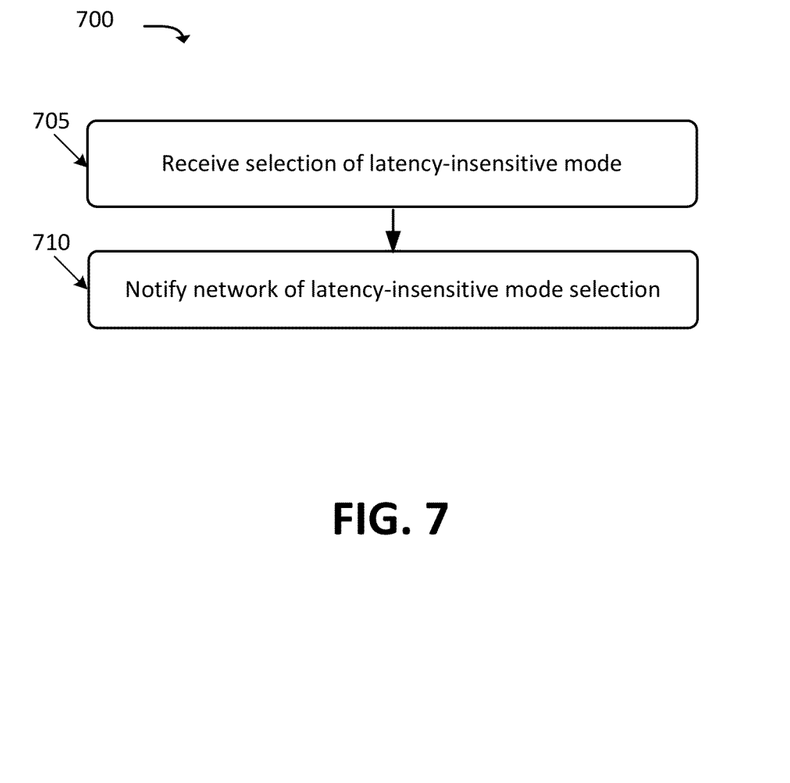
FIGS. 7 and 8 are diagrams of example processes for switching a latency mode of a user device.
Figure 8:
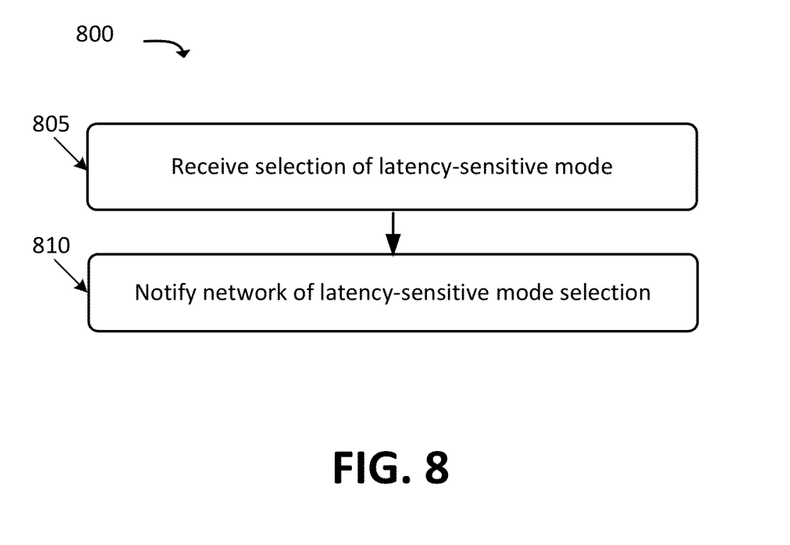

As discussed above, while some user devices 110 may include a capability of being switched from a latency-sensitive mode to a latency-insensitive mode, and vice versa. FIGS. 7 and 8 are diagrams of example processes 700 and 800 for switching a latency mode of a user device. In one example implementation, processes 700 and 800 may be performed by user device 110. In another example implementation, some or all of processes 700 or 800 may be performed by a device or collection of devices separate from, or in combination with, user device 110.

As shown in FIG. 7, process 700 may include receiving a selection of a latency-insensitive mode (block 705). For example, user device 110 may receive, from a user, a selection of a latency-insensitive mode. The selection may be received via a tactile input of user device 110 (e.g., a touchscreen, an input key, a joystick, etc.). Additionally, or alternatively, the selection may be received via another type of input of user device 110 (e.g., a voice input). The selection may be a selection of a graphical item displayed by a display of user device 110 (e.g., a menu item, an item in a list, an icon, etc.).

Additionally, or alternatively, user device 110 may automatically select a latency-insensitive (and/or latency-sensitive) mode, without a user's input. User device 110 may make the selection based on a passage of time between communications sent and/or received by user device 110 (e.g., data sent to, or received from, network 170). If a threshold amount of time has elapsed since a last communication between user device 110 and network 170, user device may automatically select a latency-insensitive mode. Further, if user device 110 is in a latency-insensitive mode, and receives or sends a communication to/from network 170, user device 110 may automatically switch the mode to a latency-sensitive mode.

When the latency-insensitive mode is selected (at block 705), timers (e.g., a TAU timer, an ISR timer, etc.) associated with user device 110 may be adjusted. For instance, if the timers are set to a particular value (e.g., one second) before the latency-insensitive mode is selected, each of the timers may be set to a value that is greater than the particular value (e.g., ten seconds). Thus, user device 110 may request/report information (e.g., location information) from a RAN less often in latency-insensitive mode than in latency-sensitive mode, based on the adjusted timers.

Process 700 may also include notifying a network, to which user device 110 is attached, of the latency-insensitive mode selection (block 710). For example, user device 110 may send a message to MME 135, via any intermediate network component (e.g., via base station 120). In turn, as discussed above, MME 135 may notify a policy server (e.g., HSS/AAA server 155) that user device 110 has switched to latency-insensitive mode.

As shown in FIG. 8, process 800 may include receiving a selection of a latency-sensitive mode (block 805). For example, user device 110 may receive, from a user, a selection of a latency-sensitive mode. The selection may be received via a tactile input of user device 110 (e.g., a touchscreen, an input key, a joystick, etc.). Additionally, or alternatively, the selection may be received via another type of input of user device 110 (e.g., a voice input). The selection may be a selection of a graphical item displayed by a display of user device 110 (e.g., a menu item, an item in a list, an icon, etc.). Also, as discussed above, the selection may be an automatic selection by user device 110 (e.g., when user device 110 detects that user device 110 has not sent/received communications for a threshold duration of time).

When the latency-sensitive mode is selected (at block 805), timers (e.g., a TAU timer, an ISR timer, etc.) associated with user device 110 may be adjusted. For instance, if the timers are set to a particular value (e.g., ten second) before the latency-sensitive mode is selected, each of the timers may be set to a value that is lesser than the particular value (e.g., one second). Thus, user device 110 may request/report information (e.g., location information) from a RAN more often in latency-sensitive mode than in latency-insensitive mode, based on the adjusted timers.

Process 800 may also include notifying a network, to which user device 110 is attached, of the latency-sensitive mode selection (block 810). For example, user device 110 may send a message to MME 135, via any intermediate network component (e.g., via base station 120). In turn, as discussed above, MME 135 may notify a policy server (e.g., HSS/AAA server 155) that user device 110 has switched to latency-sensitive mode.

Figure 9:
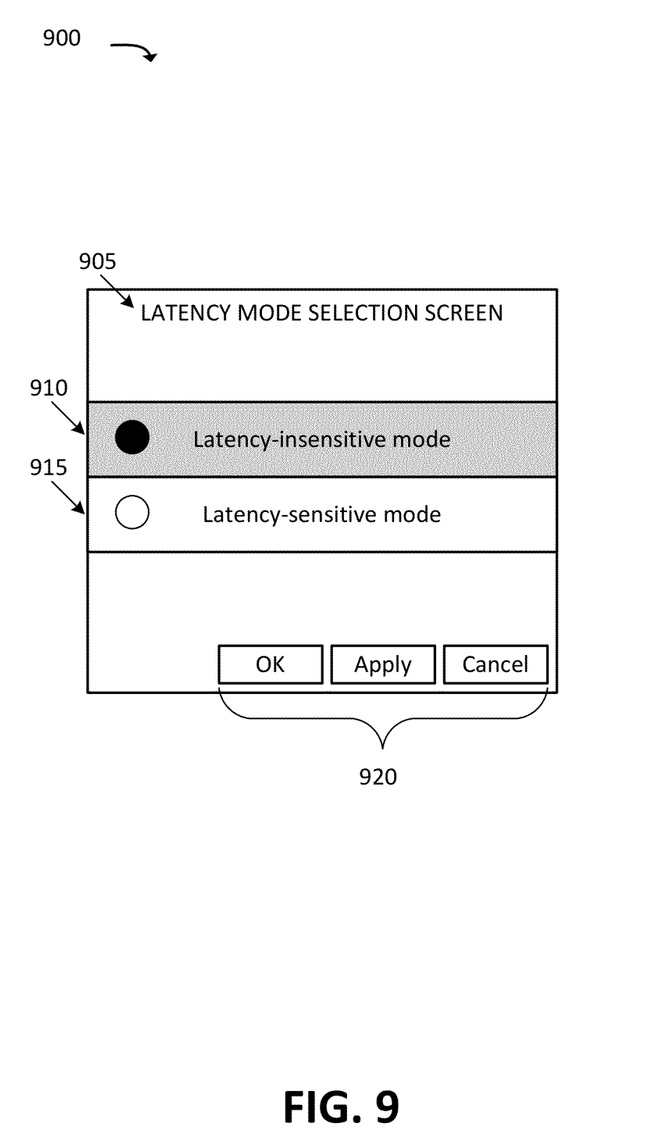
FIG. 9 is a diagram of an example user interface for switching a latency mode of a user device.

FIG. 9 illustrates an example GUI 900 that may be displayed on a display of user device 110, while the processes shown in either of FIG. 7 or 8 are performed. As shown in FIG. 9, GUI 900 may include a title 905, a "latency-insensitive mode" selection item 910, a "latency-sensitive mode" selection item 915, and buttons 920. Although FIG. 9 depicts example visual components of user interface 900, in other implementations, user interface 900 may include fewer visual components, additional visual components, different visual components, or differently visual arranged components than illustrated in FIG. 9. For example, selection items 910 and 915 may be presented in a different manner (e.g., as icons, differently colored text items, etc.).

As shown in FIG. 9, user interface 900 may include a title 905. Title 905 may serve to inform a user of user device 110 that the user has the option of selecting between a latency-insensitive and a latency-sensitive mode. Title 905 may include different, fewer, or additional words than those shown in FIG. 9.

User interface 900 may also include a "latency-insensitive mode" selection item 910 and a "latency-sensitive mode" selection item 915. As discussed above, with respect to FIGS. 7 and 8, a user of user device 110 may select between the two modes by selecting one of "latency-insensitive mode" selection item 910 and "latency-sensitive mode" selection item 915. Each of "latency-insensitive mode" selection item 910 and "latency-sensitive mode" selection item 915 may include visual indicators that indicate which mode has been selected. For example, the selected mode may be highlighted, or shaded differently from other visual portions of the screen. Additionally, or alternatively, a radio button next to the selected mode may be displayed differently (e.g., shaded, filled, etc.) than a radio button next to the un-selected mode. Additionally, or alternatively, a check mark may be displayed in connection with the selected mode, while a check mark is not displayed next in connection with the un-selected mode. Additionally, or alternatively, other visual cues may be provided that indicate which mode is selected.

User interface 900 may further include one or more buttons 920. Buttons 920 may be used to save or cancel a mode selection, and/or to navigate from user interface 900 to another GUI (not pictured). For example, buttons 920 may include an "OK" button, an "Apply" button, and a "Cancel" button. The "OK" button may save the selection of the latency mode, as selected/displayed in user interface 900, and may also navigate away from user interface 900 to another user interface. The "Apply" button may save the selection of the latency mode, as selected/displayed in GUI 900, and may also leave user interface 900 displayed on a display of user device 110. The "Cancel" button may navigate away from user interface 900, without saving any changes to the selection of the latency mode that may have been made via mode selection items 910 or 915.

The device(s) and processes described above allow a network to maintain connection information in physical memory, as well as virtual memory, thereby increasing the quantity of connections the network is able to maintain. Since the network of some embodiments is able to accommodate more user devices, elements within the network may be designed with parameters that specify the higher capacity. The higher parameters may aid network designers in designing the network (e.g., when selecting new components, replacing/upgrading existing components, etc.).

The network is able to distinguish between devices that are designated as latency-insensitive devices (or devices that are in latency-insensitive mode) and latency-sensitive devices (or devices that are in latency-sensitive mode). Network components may store connection information, associated with latency-insensitive devices, in virtual memory, while storing connection information, associated with latency-sensitive devices, in physical memory. Network components may further differentiate between active sessions and idle sessions when determining which connection information to place into physical memory instead of into virtual memory.

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 5-8, the order of the blocks may be modified in other implementations. Further, non-dependent blocks may be performed in parallel.

It will be apparent that embodiments, as described above, may be implemented in many different forms of software, firmware, and hardware in the implementations illustrated in the figures. For example, while the above-described example embodiments are described in terms of an MME of an LTE system, the above-described device(s) and processes may be implemented in any type of network. For instance, the processes described above may be performed by any network component that stores information associated with a connection of a user device 110 (e.g., by a base station 120, a SGW 130, an enhanced packet data gateway ("ePDG"), etc.).

Additionally, The above-described device(s) and processes may be implemented in a network other than an LTE network. For example, while base stations 120 were described as eNBs, any type of base station may be used to implement the above-described processes (e.g., femtocells, home Node Bs ("HNBs"), etc.).

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a server device of a telecommunications network, the method comprising:
   receiving, by the server device, an indication that a user device, communicatively coupled to the telecommunications network, is a latency-insensitive device;
   receiving, by the server device, connection information associated with a connection between the user device and the telecommunications network;
   storing, by the server device and based on the indication that the user device is a latency-insensitive device, at least a portion of the connection information, associated with the connection between the user device and the telecommunications network, in a virtual memory of the server device;
   receiving, by the server device, an indication that the connection is to become active; and
   placing, by the server device and based on receiving the indication that the connection is to become active, at least the portion of the connection information, associated with the connection between the user device and the telecommunications network, in a physical memory of the server device.

2. The method of claim 1, where the server device includes a mobile management entity device ("MME").

3. The method of claim 1, where the server device includes a base station of a radio access network ("RAN").

4. The method of claim 3, where the base station includes at least one of:
   an evolved Node B ("eNB"),
   a home Node B ("HNB"), or
   a femtocell.

5. The method of claim 1,
   where the virtual memory includes space allocated in a non-volatile memory, and
   where the physical memory includes space allocated in a volatile memory.

6. The method of claim 5,
   where the non-volatile memory includes a hard disk, and
   where the volatile memory includes a random access memory ("RAM").

7. The method of claim 1, where the indication that the connection is to become active is generated based on an indication that a communication is to be sent from the user device to the telecommunications network.

8. The method of claim 1, further comprising:
   receiving a request from the user device to switch a mode, of the user device, to a latency-sensitive mode.

9. The method of claim 8, where the indication that the connection is to become active is generated based on the request from the user device to switch the mode to the latency-sensitive mode.

10. The method of claim 1, where the indication that the connection is to become active is generated by the user device based on the user device detecting an idle connection between the user device and the telecommunications network.

11. A method, performed by a server device of a telecommunications network, the method comprising:
    receiving, by the server device, connection information associated with a connection between a user device and the telecommunications network;
    identifying, by the server device and based on the connection information, that the user device is in a latency-insensitive mode;
    storing, by the server device and based on identifying that the user device is in the latency-insensitive mode, at least a portion of the connection information, associated with the connection between the user device and the telecommunications network, in a virtual memory of the server device;
    receiving, by the server device and from the user device, an indication that the user device has switched to a latency-sensitive mode; and
    placing, by the server device and based on receiving the indication that the user device has switched to the latency-sensitive mode, at least the portion of the connection information, associated with the connection between the user device and the telecommunications network, in a physical memory of the server device.

12. The method of claim 11, further comprising:
    selecting an idle connection stored in the physical memory of the server device;
    placing connection information, associated with the idle connection, in the virtual memory of the server device; and
    freeing a portion of the physical memory, where the portion is associated with the connection information associated with the idle connection,
    where placing the connection information, associated with the connection between the user device and the telecommunications network, in the physical memory of the server device includes:

placing the connection information, associated with the connection between the user device and the telecommunications network, in the freed portion of the physical memory.

13. The method of claim 11, where the telecommunications network includes at least one of:
a long term evolution ("LTE") network, or
an evolved packet core ("EPC") network.

14. The method of claim 11, where the indication, that the user device has switched to a latency-sensitive mode, is sent by the user device as a response to a selection at the user device.

15. A system comprising:
one or more processors to:
receive a first indication that indicates that a user device is a latency-insensitive device;
receive connection information associated with a connection between the user device and a telecommunications network;
store, based on the first indication, a portion of the connection information in a virtual memory;
receive a second indication that the connection is to become active; and
place, based on receiving the second indication, the portion of the connection information into a physical memory.

16. The system of claim 15,
where the virtual memory includes space allocated in a non-volatile memory, and
where the physical memory includes space allocated in a volatile memory.

17. The system of claim 15, where, when receiving the first indication, the one or more processors are to:
receive a registration request from the user device when the user device is within a range of a base station,
the registration request including the first indication.

18. The system of claim 15, where, when receiving the first indication, the one or more processors are to:
receive a registration request that includes the first indication,
the first indication being inserted into the registration request by a mobile management entity device.

19. The system of claim 15, where the one or more processors are to:
receive a communication request associated with the user device;
determine, based on receiving the communication request, that the portion of the connection information is present in the physical memory;
retrieve the portion of the connection information from the physical memory based on determining that the portion of the connection information is present in the physical memory; and
process the communication request based on the portion of the connection information.

20. The system of claim 15, where, when placing the portion of the connection information into the physical memory, the one or more processors are to:
determine that enough space is not available in the physical memory for the portion of the connection information,
identify one or more other devices that are latency-sensitive after determining that enough space is not available in the physical memory for the portion of the connection information,
move other connection information associated with the one or more other devices from the physical memory into the virtual memory, and
place the portion of the connection information into the physical memory after moving the other connection information.

* * * * *